US009722753B2

(12) United States Patent
Lee et al.

(10) Patent No.: US 9,722,753 B2
(45) Date of Patent: Aug. 1, 2017

(54) METHOD AND APPARATUS FOR TRANSMITTING/RECEIVING RESPONSE SIGNAL IN WIRELESS COMMUNICATION SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Hak-Ju Lee, Seoul (KR); Jong-Soo Seo, Seoul (KR); Jae-Hyeon Bae, Seoul (KR); Soon-Ki Jo, Seoul (KR); Hak-Jin Kim, Daejeon (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 496 days.

(21) Appl. No.: 14/103,114

(22) Filed: Dec. 11, 2013

(65) Prior Publication Data

US 2014/0169293 A1  Jun. 19, 2014

(30) Foreign Application Priority Data

Dec. 14, 2012 (KR) .................. 10-2012-0146598

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1614* (2013.01); *H04L 1/1664* (2013.01);
(Continued)

(58) Field of Classification Search
None
See application file for complete search history.

(56) References Cited

U.S. PATENT DOCUMENTS 7,355,962 B2 * 4/2008 Li .................. H04L 1/0009
  370/208
2005/0180328 A1 * 8/2005 Kim .................. H04L 1/1887
  370/236

(Continued)

OTHER PUBLICATIONS

KDDI, Hybrid FDM/CDM Based Multiplexing for ACK/NACK Signals in E-UTRA Downlink, 3GPP TSG RAN WG1 Meeting #50, Athens, Greece, Aug. 20-24, 2007, pp. 1-5, R1-073784.

*Primary Examiner* — Hassan Phillips
*Assistant Examiner* — Gautam Sharma
(74) *Attorney, Agent, or Firm* — Jefferson IP Law, LLP

(57) ABSTRACT

A method and an apparatus for transmitting and receiving a response signal in a wireless communication system are provided. In a method for transmitting a response signal in a broadcasting system, Acknowledgement (ACK) information for uplink packet data for each user is generated. A symbol and a subcarrier which will transmit the ACK information for each user inside a transmission frame are determined. ACK transmission related information is transmitted via a control channel inside the transmission frame. The ACK information for each user is transmitted via the determined symbol and subcarrier inside the transmission frame.

22 Claims, 11 Drawing Sheets

(51) Int. Cl.
*H04L 1/18* (2006.01)
*H04L 27/26* (2006.01)
(52) U.S. Cl.
CPC .......... *H04L 1/1671* (2013.01); *H04L 1/1861* (2013.01); *H04L 27/2602* (2013.01); *H04L 1/1858* (2013.01); *H04L 5/0007* (2013.01); *H04L 5/0094* (2013.01)

(56) References Cited

U.S. PATENT DOCUMENTS

| | | | |
|---|---|---|---|
| 2005/0226198 A1* | 10/2005 | Barak | H04B 7/265 370/345 |
| 2006/0280256 A1* | 12/2006 | Kwon | H04L 5/0055 375/260 |
| 2007/0086404 A1* | 4/2007 | Jang | H04L 1/0007 370/338 |
| 2007/0161364 A1* | 7/2007 | Surineni | H04W 52/0225 455/343.4 |
| 2009/0201890 A1* | 8/2009 | Lee | H04L 1/1671 370/336 |
| 2009/0240999 A1* | 9/2009 | Lee | H04L 27/2608 714/748 |
| 2010/0002640 A1 | 1/2010 | Gorokhov et al. | |
| 2010/0054188 A1 | 3/2010 | Matsumoto et al. | |
| 2010/0322102 A1 | 12/2010 | Zhou et al. | |
| 2011/0292902 A1* | 12/2011 | Yang | H04L 1/1614 370/329 |
| 2012/0155337 A1 | 6/2012 | Park | |
| 2012/0201217 A1 | 8/2012 | Malladi | |
| 2012/0263121 A1 | 10/2012 | Chen et al. | |
| 2012/0287889 A1 | 11/2012 | Kim et al. | |

* cited by examiner

ACK=0 (IN THE CASE WHERE ACK IS NOT
    INCLUDED IN TRANSMISSION FRAME)

ACK=1 (IN THE CASE WHERE ACK IS
    INCLUDED IN TRANSMISSION FRAME)

| ACK MAPPING INFORMATION | | |
|---|---|---|
| NUMBER OF GROUPS = 1 | | |
| START ID | END ID | SYMBOL NUMBER |
| 100 | 103 | 1 |
| 104 | 107 | 2 |

FIG.2B

| ACK MAPPING INFORMATION | | |
|---|---|---|
| NUMBER OF GROUPS = 2 | | |
| START ID | END ID | SYMBOL NUMBER |
| 100 | 101 | 1 |
| 102 | 103 | 2 |
| 104 | 105 | 3 |
| 106 | 107 | 4 |

FIG.3B

METHOD AND APPARATUS FOR TRANSMITTING/RECEIVING RESPONSE SIGNAL IN WIRELESS COMMUNICATION SYSTEM

CROSS-REFERENCE TO RELATED APPLICATION(S)

This application claims the benefit under 35 U.S.C. §119(a) of a Korean patent application filed on Dec. 14, 2012 in the Korean Intellectual Property Office and assigned Serial No. 10-2012-0146598, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are Samsung Electronics Co., Ltd. and Industry-Academic Cooperation Foundation, Yonsei University.

TECHNICAL FIELD

The present disclosure relates to a wireless communication system. More particularly, the present disclosure relates to a method and an apparatus for transmitting/receiving an Acknowledgement (ACK) signal in a wireless communication system.

BACKGROUND

Recently, as distribution of an electronic device, such as a high definition digital Television (TV), a Portable Multimedia Player (PMP), and a portable broadcasting apparatus, expands, interest in a digital broadcasting system for providing various broadcasting services increases.

A transmission frame in a broadcasting system of the related art includes a synchronization channel for frame synchronization, a control channel including control information related to an important parameter of a physical layer and actual data, and a data channel via which actual broadcasting data is transmitted. Since the broadcasting system of the related art is a one-way communication system mainly for a downlink, it does not consider Acknowledgement (ACK) signal transmission.

However, recently, there has been an increase in interest in a two-way broadcasting communication system that provides improvements over a one-way communication system by collecting data from users to provide a better broadcasting service.

Therefore, a need exists for a method and an apparatus for transmitting ACK related information used for reception of an ACK signal via a control channel and transmitting an ACK signal within a transmission frame at a transmitter of a broadcasting system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting an Acknowledgement (ACK) signal at a transmitter of a broadcasting system.

Another aspect of the present disclosure is to provide a method and an apparatus for transmitting ACK related information used for reception of an ACK signal via a control channel and transmitting an ACK signal within a transmission frame at a transmitter of a broadcasting system.

Still another aspect of the present disclosure is to provide a method and an apparatus for transmitting information representing transmission/non-transmission of an ACK signal via a control channel at a transmitter of a broadcasting system.

Yet another aspect of the present disclosure is to provide a method and an apparatus for determining a symbol and a subcarrier for transmitting an ACK signal for each user, and generating ACK mapping information representing the symbol and the subcarrier determined for each user to transmit the same via a control channel at a transmitter of a broadcasting system.

Yet further another aspect of the present disclosure is to provide a method and an apparatus for transmitting an ACK signal using a phase change of each subcarrier in order to represent a sequence of ACK signals for respective users at a transmitter of a broadcasting system.

Still further another aspect of the present disclosure is to provide a method and an apparatus for classifying a plurality of subcarriers inside a symbol to a plurality of groups, and repetitively transmitting an ACK signal for a plurality of users via the plurality of groups at a transmitter of a broadcasting system.

Still yet further another aspect of the present disclosure is to provide a method and an apparatus for determining a symbol including an ACK signal of a receiver and a subcarrier position using ACK related information received from a control channel, and extracting ACK information from the determined position at the receiver of a broadcasting system.

In accordance with an aspect of the present disclosure, a method for transmitting a response signal in a broadcasting system is provided. The method includes generating ACK information for uplink packet data for each user, determining a symbol and a subcarrier which will transmit the ACK information for each user inside a transmission frame, transmitting ACK transmission related information via a control channel inside the transmission frame, and transmitting the ACK information for each user via the determined symbol and subcarrier inside the transmission frame.

In accordance with an aspect of the present disclosure, a method for receiving a response signal in a broadcasting system is provided. The method includes transmitting uplink packet data to a transmitter, receiving ACK transmission related information via a control channel from the transmitter, determining an ACK transmission symbol and a subcarrier for a receiver inside a relevant transmission frame based on the ACK related information, and receiving the ACK information for the receiver via the determined symbol and subcarrier inside the transmission frame.

In accordance with another aspect of the present disclosure, an apparatus for transmitting a response signal in a broadcasting system is provided. The apparatus includes a controller configured to generate ACK information for uplink packet data for each user, and to determine a symbol and a subcarrier which will transmit the ACK information for each user inside a transmission frame, and a transceiver configured to transmit ACK transmission related information via a control channel inside the transmission frame, and to transmit the ACK information for each user via the determined symbol and subcarrier inside the transmission frame under control of the controller.

In accordance with another aspect of the present disclosure, an apparatus for receiving a response signal in a broadcasting system is provided. The apparatus includes a transceiver configured to transmit uplink packet data to a transmitter, and to receive ACK transmission related information via a control channel from the transmitter, and a controller configured to determine an ACK transmission symbol and a subcarrier for a receiver inside a relevant transmission frame based on the ACK transmission related information, and to receive ACK information for the receiver via the determined symbol and subcarrier inside the transmission frame.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2B illustrates Acknowledgement (ACK) mapping information in a broadcasting system according to an embodiment of the present disclosure;

FIG. 3B illustrates ACK mapping information in a broadcasting system according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, a method and an apparatus for transmitting/receiving an Acknowledgement (ACK) signal in a broadcasting system are described. It is assumed in the description below that a base station determines ACK/NACK for uplink data received from a plurality of terminals, and transmits information representing the ACK/NACK. In the following description, a base station and a transmitter refer to the same element, and a receiver and a User Equipment (UE) refer to the same element. However, this is merely for convenience and not by way of limitation.

Figure 1:
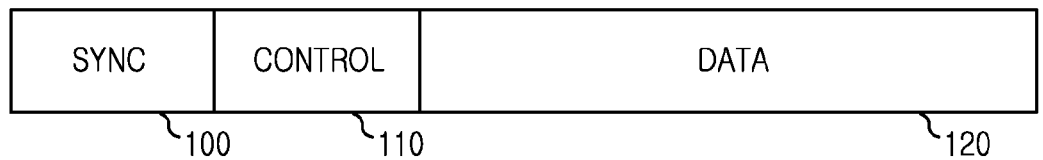
FIG. 1 illustrates a transmission frame of a broadcasting system according to an embodiment of the present disclosure.
Figure 1:
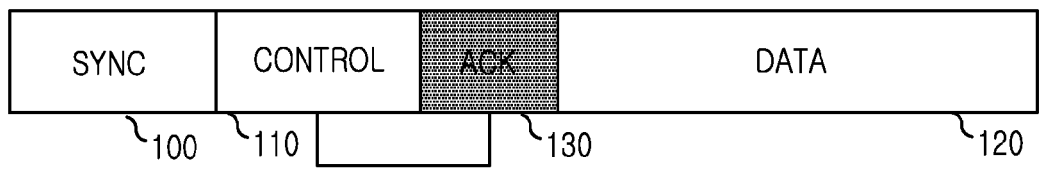

FIG. 1 illustrates a transmission frame of a broadcasting system according to an embodiment of the present disclosure.

Referring to FIG. 1, the transmission frame of the broadcasting system according to an embodiment of the present disclosure includes a synchronization channel 100 for frame synchronization, a control channel 110 including control information related to an important parameter of a physical layer and actual data, and a data channel 120 via which actual broadcasting data is transmitted.

More particularly, the transmission frame according to an embodiment of the present disclosure may additionally include at least one ACK symbol 130 representing ACK information for each user, and include ACK related information inside the control channel 110. For example, the control channel 110 includes ACK_INCLUDE information 112 representing whether an ACK symbol 130 exists inside the transmission frame, and ACK_MAPPING INFORMATION 114 representing a symbol to which ACK information for each user is converted and of which the ACK information is formed. In other words, when the ACK symbol 130 is not included inside the transmission frame, the control channel 110 may include ACK_INCLUDE information (ACK_INCLUDE=0) representing that the ACK symbol 130 is not included inside the transmission frame. In contrast, when the ACK symbol 130 is included inside the transmission frame, the control channel 110 may include ACK_INCLUDE information (ACK_INCLUDE=1) representing that the ACK symbol 130 is included inside the transmission frame. In addition, when the ACK symbol 130 is included inside the transmission frame, the control channel 110 may include ACK mapping information 114 as illustrated in FIGS. 2B and 3B. Here, the ACK mapping information 114 is information representing a symbol to which ACK information for each user is converted and of which the ACK information is formed as described above. More specifically, the ACK mapping information 114 represents ACK that information for each user is transmitted via an n-th subcarrier inside an n-th symbol, and represents the number of subcarrier groups. Here, the number of subcarrier groups denotes the number of groups classified for all subcarriers, and may represent what number of times ACK information for each user is transmitted repetitively in all subcarriers.

A structure of a transmission frame is described according to an embodiment of the present disclosure with reference to FIGS. 2A, 2B, 3A, and 3B.

Figure 2A:
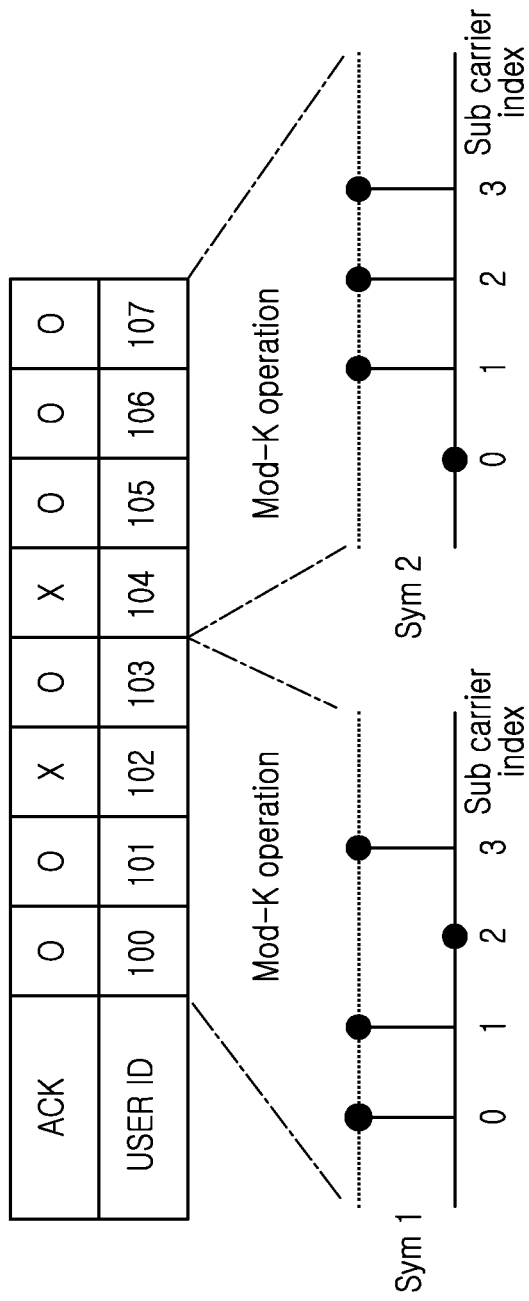
FIG. 2A illustrates a symbol and a subcarrier corresponding to each user in a broadcasting system according to an embodiment of the present disclosure.

FIG. 2A illustrates a symbol and a subcarrier corresponding to each user in a broadcasting system according to an embodiment of the present disclosure, and FIG. 2B illustrates ACK mapping information in a broadcasting system according to an embodiment of the present disclosure. Here, description is made where one ACK symbol is formed of four subcarriers, and an ACK signal is transmitted to eight UEs. In addition, description is made where a base station transmits an ACK/NACK signal to each of the eight UEs whose user Identifications (IDs) (receiver IDs) are 100, 101, 102, 103, 104, 105, 106, and 107, respectively.

Referring to FIG. 2A, since one ACK symbol is formed of four subcarriers and ACK information of one UE may be transmitted via one subcarrier, an ACK signal of each of the UEs whose user IDs are 100, 101, 102, and 103 may be transmitted via a first symbol (sym 1), and an ACK signal of each of the UEs whose user IDs are 104, 105, 106, and 107 may be transmitted via a second symbol (sym 2). At this point, the base station may perform a modulo operation on each user ID by the number of subcarriers forming one ACK symbol, map a user ID to a subcarrier index, and determine a subcarrier index which will transmit ACK with respect to each UE. In addition, the base station modulates the phase of a relevant subcarrier differently depending on ACK/NACK based on Binary Phase Shift Keying (BPSK) to allow a receiver to determine whether an ACK signal included in a relevant subcarrier represents ACK or NACK. For example, as illustrated in FIG. 2A, when the base station transmits ACK to UEs whose user IDs are 100, 101, 103, 105, 106, 107, and transmits NACK to UEs whose user IDs are 102, 104, the base station may modulate the phases such that the phases of subcarriers 0, 1, 3 of the first symbol and subcarriers 1, 2, 3 of the second symbol mapped to the user IDs 100, 101, 103, 105, 106, 107, and the phases of a subcarrier 2 of the first symbol and a subcarrier 0 of the second symbol mapped to the user IDs 102, 104 may have different values.

Referring to FIG. 2B, when transmitting an ACK symbol, ACK mapping information included in a control channel may be configured. For example, since subcarriers included in one ACK symbol have not been divided into a plurality of groups, the number of groups becomes 1. In addition, since ACK information of the UEs corresponding to the user IDs 100, 101, 102, and 103 has been included in the first symbol, and ACK information of the UEs corresponding to the user IDs 104, 105, 106, and 107 has been included in the second symbol, ACK mapping information may represent that a start ID of the UEs included in respective subcarriers of the symbol No. 1 is 100 and an end ID is 103, and a start ID of the UEs included in respective subcarriers of the symbol No. 2 is 104 and an end ID is 107.

Figure 3A:
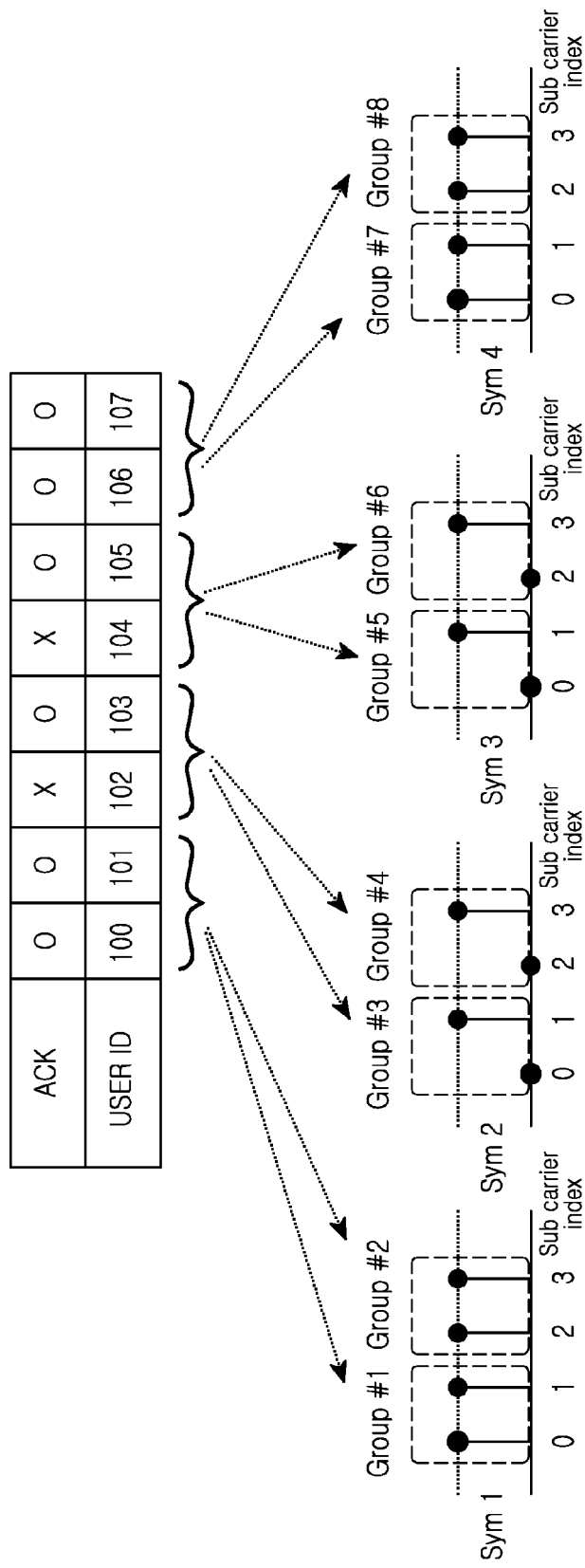
FIG. 3A illustrates a symbol and a subcarrier group corresponding to each user in a broadcasting system according to an embodiment of the present disclosure.

FIG. 3A illustrates a symbol and a subcarrier group corresponding to each user in a broadcasting system according to an embodiment of the present disclosure, and FIG. 3B illustrates ACK mapping information in a broadcasting system according to an embodiment of the present disclosure.

Here, as described with reference to FIGS. 2A and 2B, description is made where one ACK symbol consists of four subcarriers and an ACK signal is transmitted to eight UEs. In addition, here, description is made where a base station transmits an ACK/NACK signal to each of the eight UEs whose user IDs are 100, 101, 102, 103, 104, 105, 106, and 107. Here, a technique for dividing subcarriers included in one ACK symbol to groups, and repetitively transmitting an ACK signal for respective users via a plurality of groups is described.

Referring to FIG. 3A, one ACK symbol consists of four subcarriers, and the four subcarriers are classified into two groups. For example, subcarriers 0 and 1 of each ACK symbol become one group, and subcarriers 2 and 3 become the other group. At this point, one ACK symbol may repetitively transmit ACK information for two UEs by the number of groups. For example, ACK information of two UEs whose user IDs are 100 and 101 may be transmitted via the subcarriers 0 and 1 forming a group 1 of the first symbol, and repetitively transmitted via the subcarriers 2 and 3 forming a group 2 of the first symbol. Therefore, four ACK symbols in total are used for transmitting ACK information of the UEs corresponding to the user IDs 100, 101, 102, 103, 104, 105, 106, and 107, and each ACK information is repetitively transmitted by the number of groups inside a relevant ACK symbol. At this point, the base station may perform a modulo operation on each user ID by the number of subcarriers forming one group, map a user ID to a subcarrier index, and determine a subcarrier index which will transmit ACK with respect to each UE. In addition, as described in FIG. 2A, the base station may modulate the phase of a relevant subcarrier differently depending on ACK and NACK based on BPSK, and allows a receiver to determine whether an ACK signal included in the relevant subcarrier represents ACK or NACK.

Referring to FIG. 3B, when transmitting an ACK symbol, ACK mapping information included in a control channel may be configured. For example, since subcarriers included in one ACK symbol have been divided to two groups, the number of groups becomes 2. In addition, since ACK information of the UEs corresponding to the user IDs 100 and 101 has been included in a first symbol, ACK information of the UEs corresponding to the user IDs 102 and 103 has been included in a second symbol, ACK information of the UEs corresponding to the user IDs 104 and 105 has been included in a third symbol, and ACK information of the UEs corresponding to the user IDs 106 and 107 has been included in a fourth symbol. ACK mapping information may represent that a start ID of the UEs included in respective subcarriers of the symbol No. 1 is 100 and an end ID is 101, a start ID of the UEs included in respective subcarriers of the symbol No. 2 is 102 and an end ID is 103, a start ID of the UEs included in respective subcarriers of the symbol No. 3 is 104 and an end ID is 105, and a start ID of the UEs included in respective subcarriers of the symbol No. 4 is 106 and an end ID is 107.

When dividing a plurality of subcarriers into a plurality of groups, and transmitting ACK information as illustrated in FIGS. 3A and 3B, the number of UEs to which one ACK symbol may be transmitted may be reduced depending on the number of groups as compared to a case of transmitting ACK information without dividing subcarriers into groups. For example, assuming that one ACK symbol consists of 4,000 subcarriers in a 4K-FFT mode primarily used by a physical layer, when an ACK symbol is not divided into groups, ACK information may be transmitted to 4,000 UEs in total using one ACK symbol. When the ACK symbol is divided into four groups, ACK information may be repetitively transmitted four times to 1,000 UEs using one ACK symbol. However, when the ACK symbol is divided into a plurality of groups, the ACK information is repetitively transmitted by the number of groups, so that an effect of more stably transmitting the ACK information as if a repetition code were used may be obtained.

Additionally, as described above, when a base station transmits an ACK symbol including ACK information of each UE via a transmission frame, a circumstance where a UE side should determine a packet which corresponds to received ACK information may occur. For example, when a UE transmits a plurality of uplink packets to the base station and receives ACK information from the base station, the UE should know which packet corresponds to the ACK information received from the base station.

Therefore, an embodiment of the present disclosure assumes that a UE transmits sequence information of an uplink packet together when transmitting the uplink packet to a base station, and the base station may represent whether relevant ACK information is ACK for a packet of an n-th sequence using a phase modulation scheme when transmitting the ACK information for the uplink packet to the UE. In other words, the base station may map the ACK information to a constellation point corresponding to a modulation scheme, and represent whether the relevant ACK information is ACK for a packet of an n-th sequence using a method of matching a number representing a sequence with each constellation point.

Figure 4A:
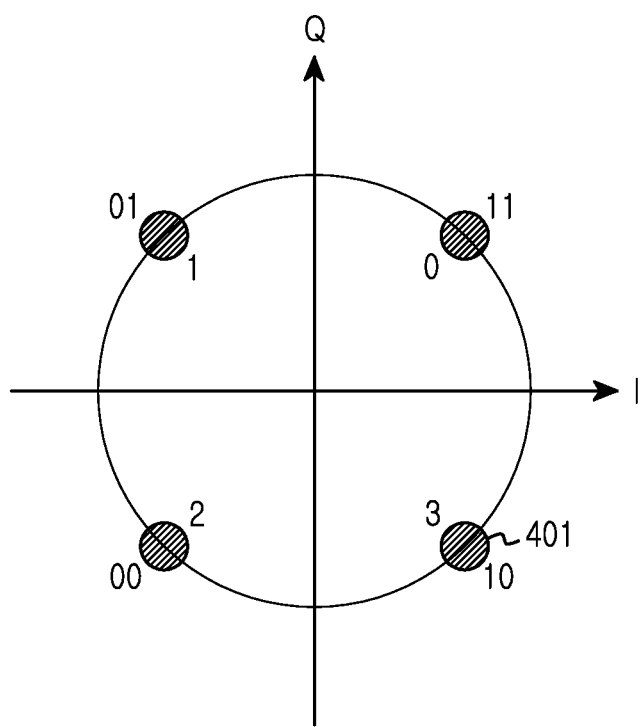
FIG. 4A illustrates a sequence of ACK signals using different constellation points of Quadrature Phase Shift Keying (QPSK) in a broadcasting system according to an embodiment of the present disclosure.

FIG. 4A illustrates a sequence of ACK signals using different constellation points of Quadrature Phase Shift Keying (QPSK) in a broadcasting system according to an embodiment of the present disclosure.

Referring to FIG. 4A, when using a QPSK modulation scheme, the base station may represent whether relevant ACK information is ACK for a packet of an n-th sequence by allocating indexes 0, 1, 2, 3 representing a sequence to four constellation points of the QPSK, respectively, and transmitting a constellation point having an index corresponding to the sequence of the relevant ACK information via a relevant subcarrier. For example, when the base station receives a packet whose sequence is 15 from UE, since the QPSK has four constellation points, the base station performs a modulo operation on the packet sequence 15 using 4, and transmits a constellation point 401 having an index coinciding with 3, which is the operation result, via a relevant subcarrier.

Figure 4B:
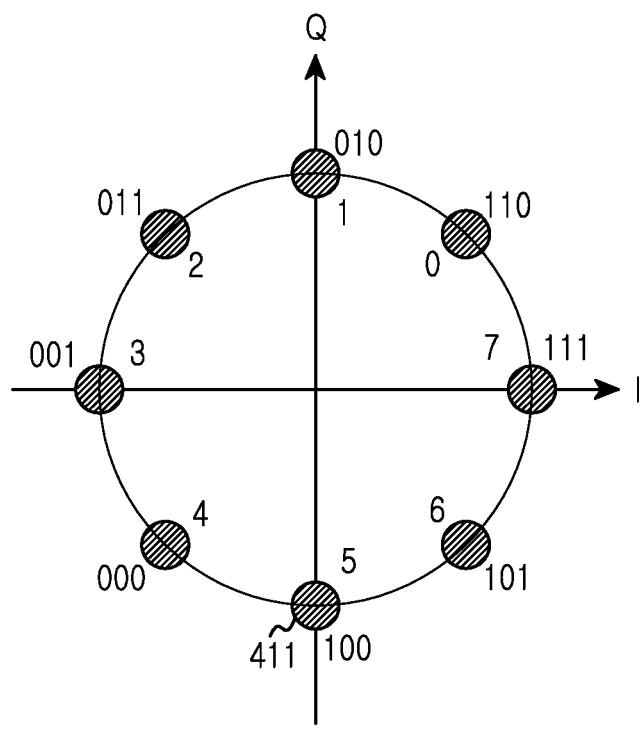
FIG. 4B illustrates a sequence of ACK signals using different constellation points of 8 Phase Shift Keying (8PSK) in a broadcasting system according to an embodiment of the present disclosure.

FIG. 4B illustrates a sequence of ACK signals using different constellation points of 8 Phase Shift Keying (8PSK) in a broadcasting system according to an embodiment of the present disclosure.

Referring to FIG. 4B, when using an 8PSK modulation scheme, the base station may represent whether relevant ACK information is ACK for a packet of an n-th sequence by allocating indexes 0, 1, 2, 3, 4, 5, 6, and 7 representing a sequence to eight constellation points of the 8PSK, respectively, and transmitting a constellation point having an index corresponding to the sequence of the relevant ACK information via a relevant subcarrier. For example, when the base station receives a packet whose sequence is 13 from a UE, since the 8PSK has eight constellation points, the base station may perform a modulo operation on the packet sequence 13 using 8, and transmit a constellation point 411 having an index coinciding with 5, which is the operation result, via a relevant subcarrier. In this case, the base station and the UE should promise in advance a method of mapping an index to each constellation point corresponding to a modulation scheme, or exchange related information.

As described above, a method of mapping an index to a constellation point of each modulation scheme to represent a sequence of ACK information may represent sequences by the number of constellation points, but cannot transmit a packet sequence of a UE perfectly. For example, in a case of QPSK, since sequences of ACK signals may be represented from 1 to 4 via four constellation points, when sequences of packets are 1, 2, 3, and 4, a UE may determine a relevant packet without a problem. However, even in a case of a packet having a sequence thereafter, since the sequence should be represented via the four constellation points in the same manner, the UE may not discriminate whether the relevant packet is a packet corresponding to 1, 2, 3, and 4, or a packet corresponding to a sequence thereafter. For example, in a case of a packet having a first sequence and a packet having a fifth sequence, indexes are mapped to the same constellation points, so that the UE cannot discriminate if the sequence of the relevant packet is 1 or 5, and may erroneously determine a packet corresponding to relevant ACK information. Therefore, a circumstance where the UE performs an unnecessary retransmission operation or does not retransmit a packet needing retransmission may occur.

To prevent this circumstance, an embodiment of the present disclosure may determine a degree M of a modulation scheme with consideration of a frequency by which a UE transmits a packet or an amount of packet transmission. For example, as the UE frequently transmits a packet or transmits a large amount of packets, the present disclosure may determine the degree M of a modulation scheme high.

In the above description, description has been made using the PSK modulation scheme as an example. This is because the PSK modulation scheme does not cause a change in amplitude allocated to a subcarrier. However, when varying allocated energy per subcarrier, the present disclosure is applicable to a Pulse Amplitude Modulation (PAM) or a Quadrature Amplitude Modulation (QAM) modulation scheme.

Figure 5:
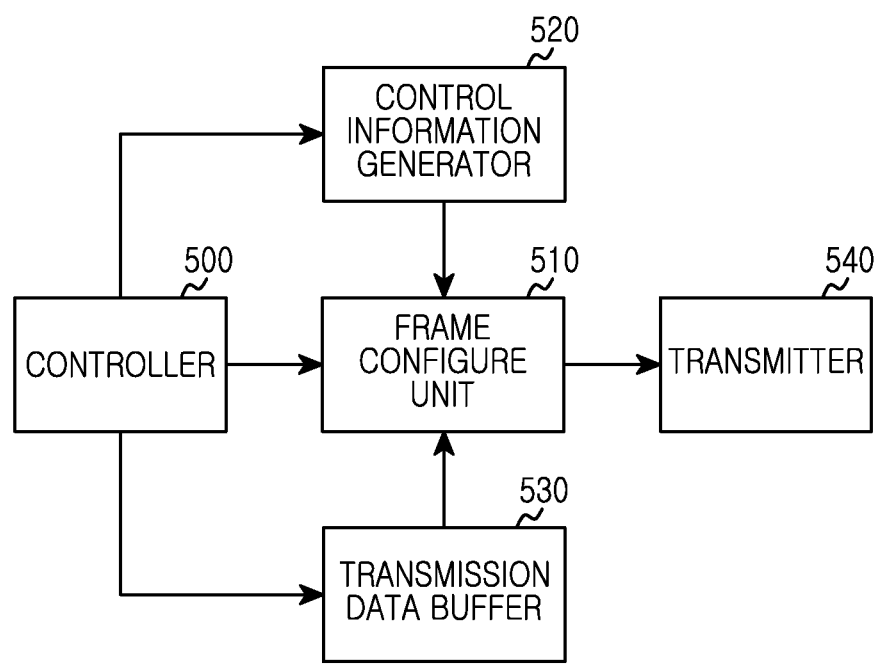
FIG. 5 is a block diagram of a transmitter in a broadcasting system according to an embodiment of the present disclosure.

FIG. 5 is a block diagram of a transmitter in a broadcasting system according to an embodiment of the present disclosure.

Referring to FIG. 5, the transmitter includes a controller 500, a frame configure unit 510, a control information generator 520, a transmission data buffer 530, and a transmitter 540.

The controller 500 controls other elements included in the transmitter to control and process a function for broadcasting broadcast service data, determines whether data from a plurality of UEs have been successfully received, and controls and processes a function for generating ACK/NACK information representing whether the data have been successfully received and transmitting the same. For example, the controller 500 controls and processes a function for transmitting ACK/NACK information received from a plurality of UEs within a transmission frame as illustrated in FIG. 1. The controller 500 controls and processes a function for transmitting ACK related information used for ACK symbol reception via a control channel in order to transmit the ACK symbol representing ACK information for each UE within the transmission frame. Here, the ACK related information includes ACK_INCLUDE information representing whether an ACK symbol exists inside the transmission frame, and ACK_MAPPING INFORMATION representing a symbol to which ACK information for each user is converted and of which the ACK information is formed. For example, in a case of not transmitting an ACK symbol 130 inside a relevant transmission frame, the controller 500 controls a function for transmitting ACK_INCLUDE information (ACK_INCLUDE=0) representing that the ACK symbol 130 is not included inside the transmission frame via a control channel. In contrast, in a case of transmitting an ACK symbol inside the relevant transmission frame, the controller 500 controls a function for transmitting ACK_INCLUDE information (ACK_INCLUDE=1) representing that the ACK symbol is included inside the transmission frame. In addition, when transmitting an ACK symbol within a relevant transmission frame, the controller 500 may control and process a function for transmitting ACK mapping information via a control channel. The ACK mapping information is information representing a symbol to which ACK information for each user is converted and of which the ACK information is formed as described above. More specifically, the ACK mapping information includes the number of subcarrier groups, and ID information of a UE allocated to each ACK symbol. In addition, when dividing all subcarriers to a plurality of groups, the controller 500 controls and processes a function for repetitively transmitting ACK information for each UE by the number of the divided groups. In addition, the controller 500 determines a sequence of data received from a plurality of UEs, and controls and processes a function for representing a relevant sequence when transmitting ACK information.

The frame configure unit 510 receives control information related to a physical layer parameter and transmission data from the control information generator 520, and receives transmission data for a broadcast service from the transmission data buffer 530 to configure a transmission frame under control of the controller 500. More particularly, the frame configure unit 510 receives ACK information and ACK related information used for ACK information reception from the control information generator 520 to configure a transmission frame. In addition, the frame configure unit 510 performs a function for mapping ACK information mapped to each subcarrier of an ACK symbol inside a transmission frame to a constellation point having an index corresponding to a relevant sequence based on an index mapped to a constellation point of a modulation scheme determined in advance under control of the controller 500. The control information generator 520 generates control information for every transmission frame under control of the controller 500. For example, the control information generator 520 generates control information related to a physical layer parameter and transmission data, ACK information, and ACK related information used for ACK information reception, and provides the generated information to the frame configure unit 510 under control of the controller 500. At this point, the ACK related information denotes ACK include information (ACK_INCLUDE) and ACK mapping information (ACK_MAPPING INFORMATION). The transmission data buffer 530 generates transmission data for a broadcast service, and provides the generated transmission data to the frame configure unit 510 under control of the controller 500. The transmitter 540 transmits a transmission frame output from the frame configure unit 510.

Though FIG. 5 is a block diagram of the base station, and explains and illustrates elements for transmitting ACK for convenience of description, it is obvious that additional elements may be included besides the above-described elements. For example, the base station may additionally include elements for receiving and processing uplink data from a UE.

Figure 6:
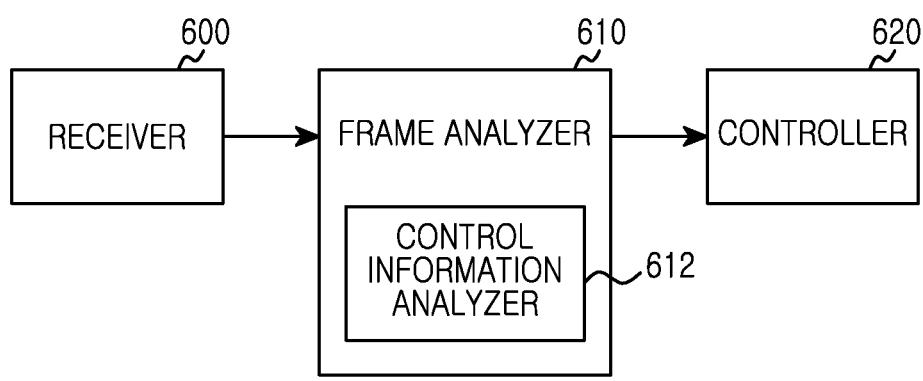
FIG. 6 is a block diagram of a receiver in a broadcasting system according to an embodiment of the present disclosure.

FIG. 6 is a block diagram of a receiver in a broadcasting system according to an embodiment of the present disclosure.

Referring to FIG. 6, the receiver includes a receiver 600, a frame analyzer 610, and a controller 620.

The receiver 600 receives a transmission frame transmitted from a transmitter to provide the frame to the frame analyzer 610. The frame analyzer 610 analyzes the frame provided from the receiver 600 to provide data for a broadcast service to the controller 620. More particularly, the frame analyzer 610 analyzes control information included in a control channel, that is, ACK include information and ACK mapping information to determine whether an ACK symbol exists inside a transmission frame by including a control information analyzer 612 according to an embodiment of the present disclosure. When an ACK symbol exists inside the transmission frame, the control information analyzer 612 analyzes ACK mapping information to determine a transmission position (i.e., a symbol position and a subcarrier position) of ACK information corresponding to the receiver itself, and obtains ACK information at the determined transmission position to provide the same to the controller 620. At this point, when the ACK information is mapped to a constellation point of a modulation scheme determined in advance, the control information analyzer 612 determines an index mapped to a relevant constellation point to provide the same to the controller 620.

The controller 620 controls other elements included inside the receiver to control and process a function for receiving broadcast service data, and receives ACK information from the control information analyzer 612 to determine whether transmission of uplink packet data transmitted to the transmitter from the receiver is successful. When receiving an index for ACK information from the control information analyzer 612, the controller 620 may determine whether relevant ACK information is ACK of an n-th transmission packet based on the received index. When ACK information represents ACK for a specific uplink packet, the controller 620 determines that the relevant uplink packet has been successfully transmitted. When ACK information represents NACK for a specific uplink packet, the controller 620 determines that transmission of a relevant uplink packet has failed and controls and processes a function for retransmitting the relevant uplink packet.

Though FIG. 6 is a block diagram of a UE, and explains and illustrates elements for receiving ACK for convenience of description, it is obvious that additional elements may be included besides the above-described elements. For example, the UE may additionally include elements for transmitting uplink data to a base station.

Figure 7:
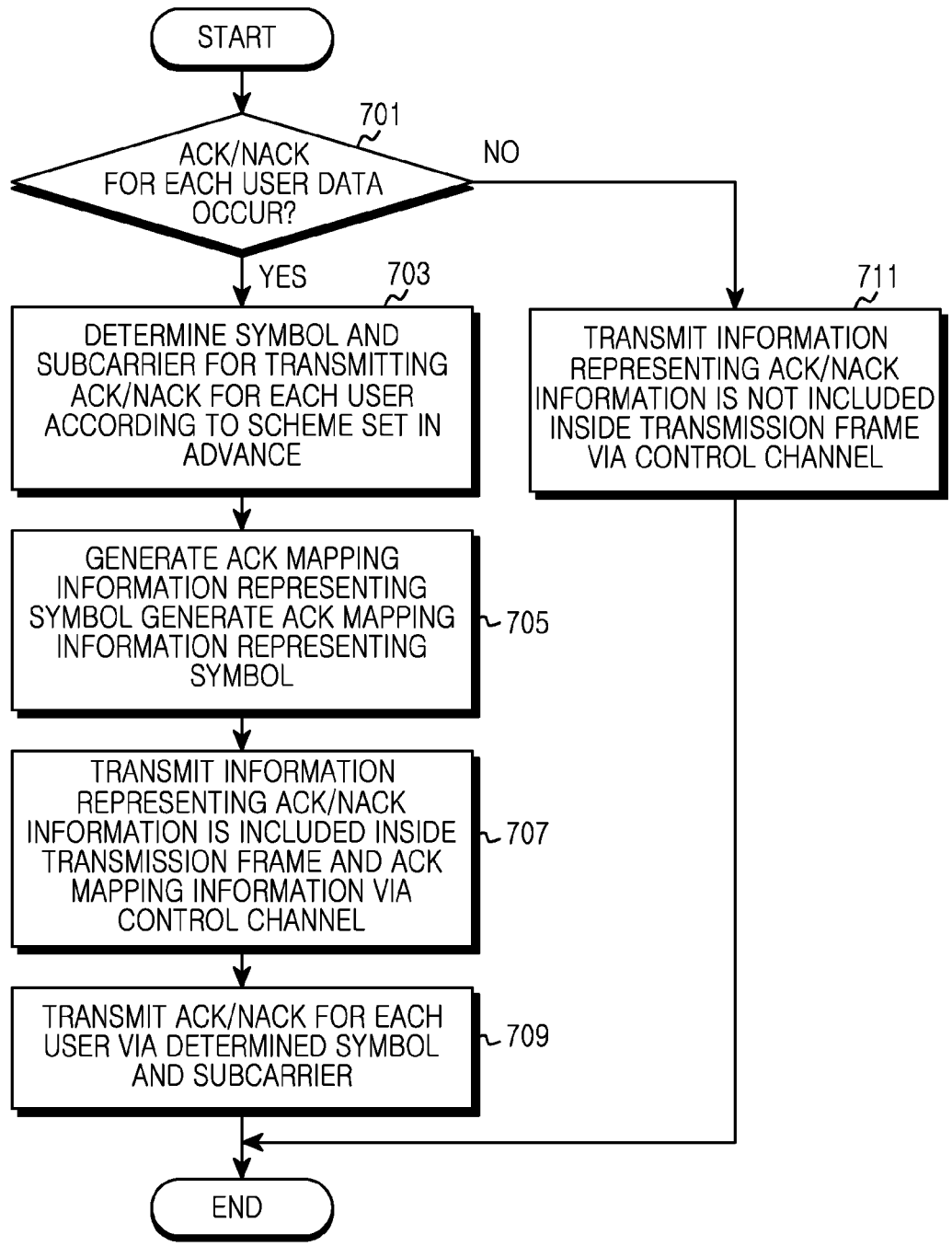
FIG. 7 illustrates an ACK signal transmission procedure of a transmitter in a broadcasting system according to an embodiment of the present disclosure.

FIG. 7 illustrates an ACK signal transmission procedure of a transmitter in a broadcasting system according to an embodiment of the present disclosure.

Referring to FIG. 7, the transmitter examines whether ACK/NACK for each user data occurs in operation 701. When ACK/NACK for each user data does not occur, the transmitter proceeds to operation 711 to transmit information representing ACK/NACK information has not been included in a transmission frame via a control channel, and ends the procedure according to an embodiment of the present disclosure.

In contrast, when ACK/NACK for each user data occurs, the transmitter determines a symbol and a subcarrier for transmitting ACK/NACK for each user depending on a scheme determined in advance in operation 703. For example, the transmitter determines the number of UEs, ACK for which will be transmitted via one ACK symbol based on the number of subcarriers inside one ACK symbol, and maps IDs of the determined UEs to a subcarrier inside the relevant ACK symbol. In addition, the transmitter divides subcarriers inside one ACK symbol into a plurality of groups, determines the number of UEs, ACK for which will be transmitted via one ACK symbol based on the number of subcarriers inside one group, and maps an ID of a UE to a subcarrier inside the plurality of groups.

Thereafter, the transmitter generates ACK mapping information representing a symbol and a subcarrier determined for ACK/NACK transmission for each user in operation 705. For example, the transmitter represents whether ACK information for each user is transmitted via an n-th subcarrier inside an n-th symbol, and represents the number of subcarrier groups. Here, the number of subcarrier groups denotes the number of groups classified for all subcarriers, and may represent the number of times by which ACK information for each user is repetitively transmitted in all subcarriers.

Thereafter, the transmitter transmits ACK include information representing that ACK/NACK information is included in a transmission frame, and ACK mapping information via a control channel in operation 707, and transmits ACK/NACK for each user via the determined symbol and subcarrier in operation 709. Here, the transmitter may represent whether relevant ACK information is ACK information corresponding to an n-th packet among uplink packets transmitted by a relevant UE by mapping an index representing a sequence to a constellation point of a modulation scheme set in advance, and mapping ACK information to transmit to each UE to a constellation point and transmitting the same. At this point, a degree of a modulation scheme may be determined by a frequency by which the UE transmits a packet and an amount of packet transmission.

Thereafter, the transmitter ends the procedure according to an embodiment of the present disclosure.

Figure 8:
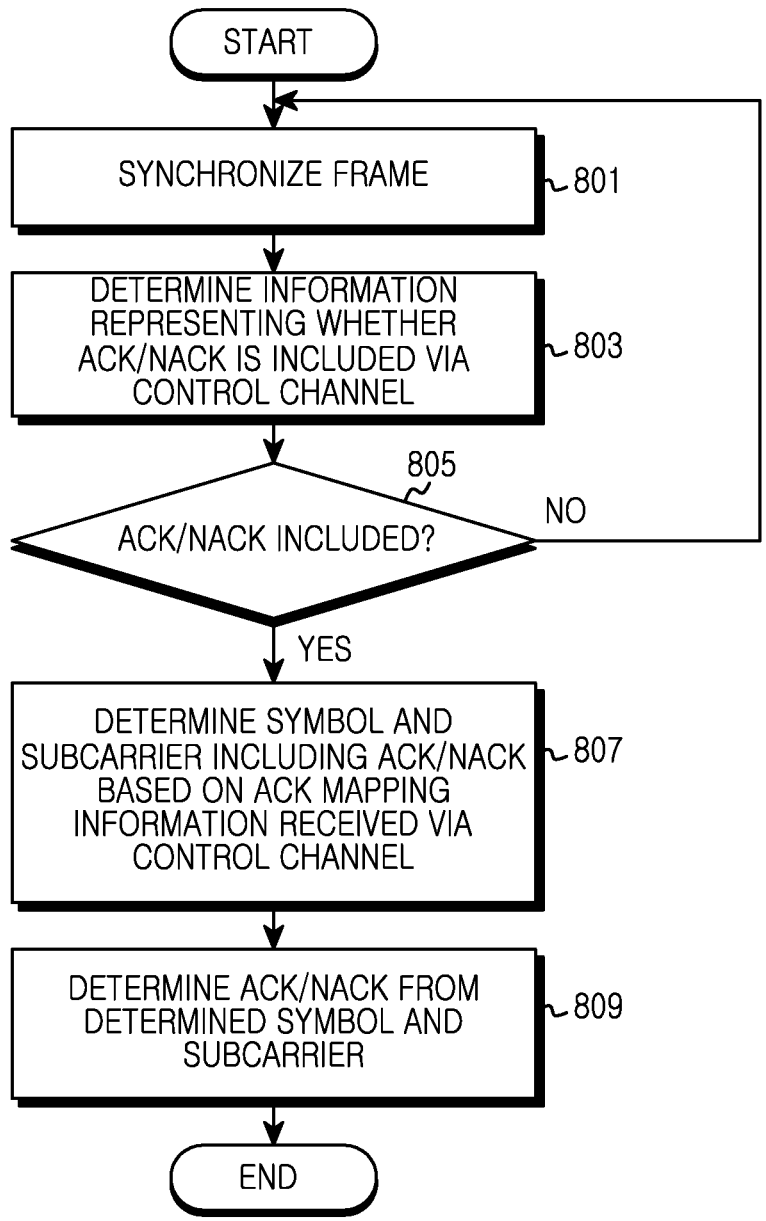
FIG. 8 illustrates an ACK signal reception procedure of a receiver in a broadcasting system according to an embodiment of the present disclosure.

FIG. 8 illustrates an ACK signal reception procedure of a receiver in a broadcasting system according to an embodiment of the present disclosure.

Referring to FIG. 8, the receiver performs frame synchronization using a synchronization channel in operation 801, and proceeds to operation 803 to receive and determine ACK include information representing whether ACK/NACK information is included in a relevant transmission frame via a control channel. Thereafter, the receiver determines whether ACK/NACK is included in the relevant transmission frame based on the ACK include information in operation 805. When ACK/NACK is not included in the relevant transmission frame, the receiver returns to operation 801 to re-perform subsequent operations.

In contrast, when ACK/NACK is included in the relevant transmission frame, the receiver proceeds to operation 807 to receive ACK mapping information via the control channel, and determine a symbol and a subcarrier including ACK/NACK corresponding to a user ID of the receiver itself based on the received ACK mapping information. Thereafter, the receiver determines that ACK/NACK for uplink data of the receiver itself from the symbol and the subcarrier determined in operation 809. At this point, when information is not included in the determined symbol and subcarrier, the receiver determines NACK for uplink data has occurred, and performs a procedure for retransmitting the relevant uplink data. In addition, when ACK information received via the determined symbol and subcarrier is mapped to a specific constellation point of a modulation scheme determined in advance, the receiver may determine whether the relevant ACK information is ACK information corresponding to an n-th uplink packet based on an index mapped to the relevant constellation point. Additionally, the receiver may determine that ACK/NACK corresponding to a user ID of the receiver itself is received via a plurality of subcarriers based on ACK mapping information. At this point, the receiver may reduce a symbol error rate by combining ACK/NACK information received via the plurality of subcarriers.

Thereafter, the receiver ends the procedure according to an embodiment of the present disclosure.

According to the present disclosure, a transmitter of a broadcasting system may perform a fast and stable transmission of an ACK signal to a receiver by transmitting ACK related information used for ACK signal reception via a control channel, wherein the ACK signal is transmitted inside a transmission frame. The receiver determines whether transmission of a packet of the receiver itself is successful using only an ACK symbol without unnecessary subsequent operations, such as demodulation and demultiplexing. In addition, the present disclosure has an advantage of providing feedback information for an uplink by utilizing an existing broadcasting frame structure without utilizing a separate channel.

Meanwhile, operations according to the embodiments of the present disclosure may be implemented by a single controller. In this case, a program instruction for performing an operation realized by various computers may be recorded on a computer readable medium. The computer readable medium may include a program instruction, a data file, a data structure, and the like, in a single form or a combination thereof. The program instruction may be specially designed and configured for the present disclosure, or known and available by a person of ordinary skill in the art. An example of the computer readable medium includes a hardware device specially configured for storing and performing a program instruction, such as a magnetic medium, e.g., a hard disk, a floppy disk, and a magnetic tape, an optical recording medium, e.g., a Compact Disc-Read Only Memory (CD-ROM) or a Digital Versatile Disc (DVD), a magnetic-optical medium, e.g., a floptical disk, a Random Access Memory (RAM), a flash memory, and the like. An example of a program instruction includes not only a machine language code, such as things generated by a complier, but also a high level language code executable via an interpreter by a computer, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a transmitting end in a broadcast system, the method comprising:
generating each acknowledgement (ACK) information for each uplink packet data from each of a plurality of terminals;
determining a first plurality of subcarriers in a symbol in a transmission frame, wherein each of the plurality of terminals is mapped to each of the first plurality of subcarriers according to a mapping relation;

transmitting, to the plurality of terminals, information regarding the mapping relation; and transmitting, to the plurality of terminals, a response signal comprising the each ACK information via the first plurality of subcarriers in the symbol according to the information regarding the mapping relation, wherein the information regarding the mapping relation is used for each of the plurality of terminals to identify at least one subcarrier where ACK information corresponding to each of the plurality of terminals is transmitted among the first plurality of subcarriers in the response signal.

2. The method of claim 1, wherein the determining of the first plurality of subcarriers in the symbol comprises:

mapping each terminal identification (ID) to a first subcarrier index of the first plurality of subcarriers in the symbol.

3. The method of claim 2, wherein the mapping of each terminal ID to the first subcarrier index of the first plurality of subcarriers in the symbol comprises:

performing a modulo operation on each of the terminal ID using the number of the first plurality of subcarriers; and determining the first subcarrier index corresponding to each terminal ID using a modulo operation result value for each terminal ID.

4. The method of claim 2, further comprising:

mapping each terminal ID repetitively to a second subcarrier index of a second plurality of subcarriers in the symbol.

5. The method of claim 4, wherein the information regarding the mapping relation comprises a symbol number, the first subcarrier index, and the second subcarrier index.

6. The method of claim 1, wherein the transmitting of each of the ACK information via the first plurality of subcarriers comprises:

mapping an index representing a sequence to a constellation point of a modulation scheme set in advance;

determining a sequence of uplink packet data corresponding to each of the ACK information to transmit; and mapping each of the ACK information to a constellation point having an index corresponding to a relevant sequence.

7. The method of claim 6, further comprising:

transmitting the constellation point having an index corresponding to the relevant sequence of each of the ACK information via a relevant subcarrier, wherein the phase of the relevant subcarrier is modulated differently depending on an ACK and a non-acknowledgement (NACK) based on phase shift keying (PSK).

8. A method for operating a terminal in a broadcast system, the method comprising:

receiving, from a transmitting end, information regarding a mapping relation, wherein each of a plurality of terminals including the terminal is mapped to a first plurality of subcarriers according to the mapping relation;

receiving, from the transmitting end, a response signal comprising each acknowledgement (ACK) information for each uplink packet data for each of the plurality of terminals via the first plurality of subcarriers in the symbol; and identifying at least one subcarrier where ACK information corresponding to the terminal is transmitted among the first plurality of subcarriers in the response signal according to the information regarding the mapping relation.

9. The method of claim 8, wherein the information regarding the mapping relation comprises a symbol number and a first subcarrier index.

10. The method of claim 8, wherein the receiving of each of the ACK information comprises:

determining a constellation point of the ACK information;

determining a sequence of the ACK information based on an index corresponding to the constellation point; and determining whether the ACK information is a response signal for an n-th uplink packet data according to a sequence of the ACK information.

11. The method of claim 8, wherein the receiving of each of the ACK information via the first plurality of subcarriers comprises:

repetitively receiving the ACK information via a second plurality of subcarriers; and combining the ACK information repetitively received via the second plurality of subcarriers.

12. An apparatus of a transmitting end in a broadcast system, the apparatus comprising:

at least one processor configured to:

generate each acknowledgement (ACK) information for each uplink packet data from each of a plurality of terminals, and determine a first plurality of subcarriers in a symbol in a transmission frame, wherein each of the plurality of terminals is mapped to each of the first plurality of subcarriers according to a mapping relation; and a transceiver configured to:

transmit, to the plurality of terminals, information regarding the mapping relation, and transmit, to the plurality of terminals, a response signal comprising the each ACK information via the first plurality of subcarriers in the symbol according to the information regarding the mapping relation, wherein the information regarding the mapping relation is used for each of the plurality of terminals to identify at least one subcarrier where ACK information corresponding to each of the plurality of terminals is transmitted among the first plurality of subcarriers in the response signal.

13. The apparatus of claim 12, wherein the at least one processor is further configured to map each terminal Identification (ID) to a first subcarrier index of the first plurality of subcarriers in the symbol.

14. The apparatus of claim 13, wherein the at least one processor is further configured to:

perform a modulo operation on each terminal ID using the number of the first plurality of subcarriers, and determine the first subcarrier index corresponding to each terminal ID using a modulo operation result value for each terminal ID.

15. The apparatus of claim 13, wherein the at least one processor is further configured to map each terminal ID repetitively to a second subcarrier index of a second plurality of subcarriers in the symbol.

16. The apparatus of claim 15, wherein the ACK transmission related information comprises a symbol number, the first subcarrier index, and the second subcarrier index.

17. The apparatus of claim 12, wherein the at least one processor is further configured to control a function for:

mapping an index representing a sequence to a constellation point of a modulation scheme set in advance, determining a sequence of uplink packet data corresponding to each of the ACK information to transmit, and mapping each of the ACK information to a constellation point having an index corresponding to a relevant sequence.

18. The apparatus of claim 17, wherein the transceiver is further configured to transmit the constellation point having an index corresponding to the relevant sequence of each of the ACK information via a relevant subcarrier, and wherein the phase of the relevant subcarrier is modulated differently depending on an ACK and a non-acknowledgement (NACK) based on phase shift keying (PSK).

19. An apparatus of a terminal in a broadcast system, the apparatus comprising:

a transceiver configured to:

receive, from a transmitting end, information regarding a mapping relation, wherein each of a plurality of terminals including the terminal is mapped to a first plurality of subcarriers according to the mapping relation, and receive, from the transmitting end, a response signal comprising each acknowledgement (ACK) information for each uplink packet data for each of the plurality of terminals via the first plurality of subcarriers in the symbol; and at least one processor configured to identify at least one subcarrier where ACK information corresponding to the terminal is transmitted among the first plurality of subcarriers in the response signal according to the information regarding the mapping relation.

20. The apparatus of claim 19, wherein the ACK transmission related information comprises a symbol number and the first subcarrier index.

21. The apparatus of claim 19, wherein the at least one processor is further configured to:

determine a constellation point of the ACK information, determine a sequence of the ACK information based on an index corresponding to the constellation point, and determine whether the ACK information is a response signal for an n-th uplink packet data according to a sequence of the ACK information.

22. The apparatus of claim 19, wherein the at least one processor is further configured to:

repetitively receive the ACK information via a second plurality of subcarriers, and combine the ACK information repetitively received via the first plurality of subcarriers.

* * * * *